H. MAXWELL.
END RING FOR INDUCTION MOTORS.
APPLICATION FILED FEB. 28, 1910.
976,670.
Patented Nov. 22, 1910.
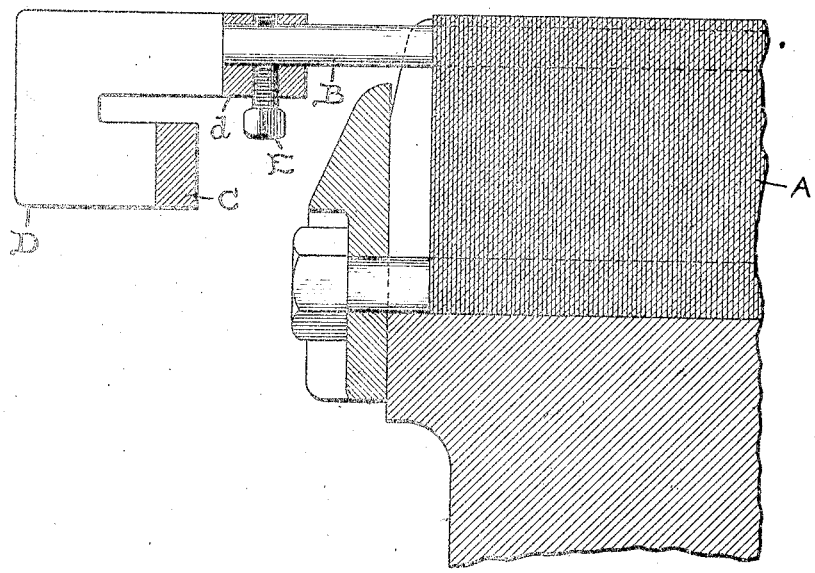
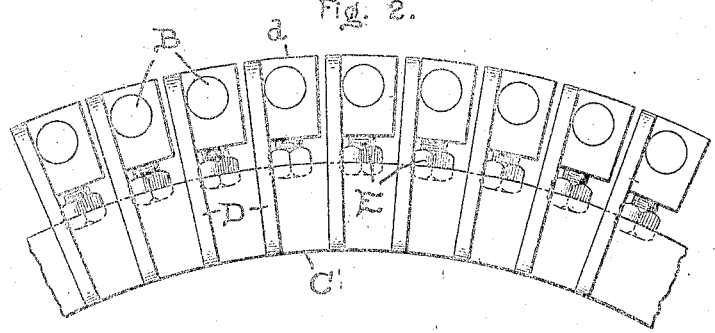
WITNESSES:
Lester H. Palmer
J. Ellis Glen
INVENTOR.
HOWARD MAXWELL.
BY Albert G. Davis
HIS ATTORNEY.

UNITED STATES PATENT OFFICE.

HOWARD MAXWELL, OF SCHENECTADY, NEW YORK, ASSIGNOR TO GENERAL ELECTRIC COMPANY, A CORPORATION OF NEW YORK.

END RING FOR INDUCTION-MOTORS.

976,670.　　　　　Specification of Letters Patent.　　Patented Nov. 22, 1910.

Application filed February 28, 1910.　Serial No. 546,304.

*To all whom it may concern:*

Be it known that I, HOWARD MAXWELL, a citizen of the United States, residing at Schenectady, in the county of Schenectady, State of New York, have invented certain new and useful Improvements in End Rings for Induction-Motors, of which the following is a specification.

My invention relates to induction motors of the squirrel cage type, and particularly to motors of this type having high resistance end rings.

Where considerable starting torque is required in a squirrel cage induction motor a certain amount of resistance must be introduced into the circuit of the rotor winding, that is, into the squirrel cage, and this result has been accomplished heretofore by using high resistance end rings, or end rings in which the connections between the end ring and armature conductors are of comparatively high resistance. In order that these connections may be of sufficient cross section to carry the current without overheating and yet have sufficient resistance, it is necessary that they should be given an appreciable length. The length of the connections as heretofore arranged has, however, been objectionable since they are not in inductive relation to the primary winding and, therefore, introduce considerable self induction into the rotor circuit and thereby impair the efficiency of the motor.

My invention consists in so forming the end connections that they may have a considerable length with very little self induction and I accomplish this result by doubling each connection back upon itself.

My invention further consists in casting an end ring with end connections integral therewith and each doubled back on itself for the reason given above.

While the number of end connections is preferably the same as the number of conductors, each connection may be made common to two or more conductors.

My invention will best be understood by reference to the accompanying drawing in which—

Figure 1 shows a side elevation in cross section of a portion of a squirrel cage rotor arranged in accordance with my invention, and Fig. 2 shows a side elevation of a portion of the end ring and the ends of the conductors.

In the drawings, A represents the laminated body of the rotor and B the rotor conductors carried in slots in the usual manner with their ends projecting beyond the laminated core.

C represents an end ring for the rotor conductors which is cast with projections D integral with the ring. Each of these projections is doubled back on itself, as is best shown in Fig. 1. It will be seen that with this construction the connecting members D may have a considerable length and yet a very small self induction. At their ends the members D are enlarged, as shown at *d*, to receive the ends of the rotor conductors, and suitable means, such as the bolts E, are provided for securing the connecting members to the ends of the rotor conductor.

I do not desire to limit myself to the particular construction and arrangement of parts shown, but aim in the appended claims to cover all modifications which are within the scope of my invention.

What I claim as new and desire to secure by Letters Patent of the United States, is—

1. In an induction motor of the squirrel-cage type, in combination with the rotor conductors and end rings therefor, connections between the rotor conductors and an end ring consisting of conductors doubled back on themselves so as to have an appreciable length with minimum self induction.

2. In an induction motor of the squirrel cage type, in combination with the rotor conductors, an end ring for said conductors provided with connecting members projecting from and integral with said ring, said connecting members being of appreciable length and doubled back on themselves, and means for securing the ends of said connecting members to the ends of the rotor conductors.

3. In an induction motor of the squirrel cage type, in combination with the rotor conductors, a cast end ring having integral therewith connecting members corresponding in number to the number of conductors, each of said members being of appreciable length and doubled back on itself.

In witness whereof, I have hereunto set my hand this 26th day of February 1910.

HOWARD MAXWELL.

Witnesses:
　BENJAMIN B. HULL,
　HELEN ORFORD.